(12) United States Patent
Messinger et al.

(10) Patent No.: US 11,718,391 B2
(45) Date of Patent: Aug. 8, 2023

(54) ROTARY AIRCRAFT HYBRID ROTOR MAST

(71) Applicant: AVX Aircraft Company, Benbrook, TX (US)

(72) Inventors: Stan Messinger, Hurst, TX (US); Clayton Messinger, Grapevine, TX (US)

(73) Assignee: AVX AIRCRAFT COMPANY, Benbrook, TX (US)

( * ) Notice: Subject to any disclaimer, the term of this patent is extended or adjusted under 35 U.S.C. 154(b) by 0 days.

(21) Appl. No.: 17/580,392

(22) Filed: Jan. 20, 2022

(65) Prior Publication Data

US 2022/0324557 A1 Oct. 13, 2022

Related U.S. Application Data

(60) Provisional application No. 63/164,884, filed on Mar. 23, 2021.

(51) Int. Cl.
*B64C 27/14* (2006.01)

(52) U.S. Cl.
CPC .................................. *B64C 27/14* (2013.01)

(58) Field of Classification Search
CPC ...................................................... B64C 27/14
See application file for complete search history.

(56) References Cited

U.S. PATENT DOCUMENTS

| 7,938,628 | B2 | 5/2011 | Lin | |
| 9,821,520 | B2* | 11/2017 | Kendrick | B29C 66/612 |
| 10,017,247 | B1 | 7/2018 | Elliott et al. | |
| 2010/0166568 | A1* | 7/2010 | Lin | B64C 27/12 |
| | | | | 264/269 |
| 2014/0377073 | A1* | 12/2014 | Kennedy | B64C 27/48 |
| | | | | 403/376 |

* cited by examiner

*Primary Examiner* — Tye William Abell
(74) *Attorney, Agent, or Firm* — Greenberg Traurig, LLP

(57) ABSTRACT

A shaft assembly (which may be a rotor mast for a rotorcraft) may include a shaft body formed with composite material and one or more metal fittings attached to the shaft body. A metal fitting may include an interior opening with a cross-section having a non-circular perimeter (such as an oval or an ellipse). The interior opening may also include contouring, such as a first tapered section in which the fitting converges toward the longitudinal axis of the shaft body and a second tapered section in which the fitting diverges from the longitudinal axis.

20 Claims, 3 Drawing Sheets

ROTARY AIRCRAFT HYBRID ROTOR MAST

CROSS-REFERENCE TO RELATED APPLICATIONS

The present application claims priority to U.S. Provisional Patent Application No. 63/164,884, filed Mar. 23, 2021, which is incorporated herein in its entirety by reference.

STATEMENT REGARDING FEDERALLY SPONSORED RESEARCH

The inventions disclosed herein were made with government support under W911W6-13-2-0004 awarded by the United States Army Contracting Command. The government has certain rights in the inventions.

TECHNICAL FIELD

The present disclosure is directed generally to rotor masts for rotary aircraft, and associated systems and methods.

BACKGROUND

Rotor masts transfer rotation (torque) from a transmission or engine to an aircraft rotor hub to drive the aircraft rotor, which produces thrust. Conventional rotor masts consist of metal components that contribute to the overall weight of the aircraft and reduce efficiency. All-metal rotor masts are also susceptible to corrosion and fatigue. Accordingly, there is a desire for durable rotor masts with reduced weight. Aspects of the present technology are generally directed to addressing these challenges.

SUMMARY

Representative embodiments of the present technology include a shaft assembly for transferring rotation from a power source to a hub. In some embodiments, the shaft assembly includes a shaft body having composite material, the shaft body extending along a longitudinal axis, and a fitting attached to the shaft body, the fitting having an interior opening positioned to receive the shaft body. In some embodiments, a cross-section of the interior opening taken perpendicular to the longitudinal axis comprises a non-circular perimeter.

Other representative aspects include an aerospace system including an aerospace vehicle, a power source carried by the aerospace vehicle, a rotor assembly including a hub and one or more (such as two or more) rotor blades supported by the hub, and a shaft assembly for transferring rotation from the power source to the hub, the shaft assembly being configured in accordance with embodiments of the present technology.

Other representative aspects include a fitting for a rotatable shaft assembly, the fitting having an interior opening positioned to receive a shaft body, wherein the interior opening includes a converging portion, a diverging portion, and a non-circular portion positioned between the converging portion and the diverging portion.

Embodiments of the present technology provide rotor masts and other shaft assemblies with improved weight and durability characteristics, among other advantages.

Other features and advantages will appear hereinafter. The features described herein can be used separately or together, or in various combinations of one or more of them.

BRIEF DESCRIPTION OF THE DRAWINGS

In the drawings, wherein the same reference number indicates the same element throughout the several views.

DETAILED DESCRIPTION

The present technology is generally directed to rotor masts for rotary aircraft, and associated systems and methods. Various embodiments of the technology will now be described. The following description provides specific details for a thorough understanding and enabling description of these embodiments. One skilled in the art will understand, however, that the invention may be practiced without many of these details. Additionally, conventional or well-known aspects of rotorcraft and composite materials may not be shown or described in detail so as to avoid unnecessarily obscuring the relevant description of the various embodiments. Any of the features described herein may be combined in suitable manners with any of the other features described herein without deviating from the scope of the present technology. Accordingly, embodiments of the present technology may include additional elements, or may exclude some of the elements described below with reference to FIGS. 1-5, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

As used herein, the term "and/or" when used in the phrase "A and/or B" includes A alone, B alone, and both A and B. A similar manner of interpretation applies to the term "and/or" when used in a list of more than two terms. Further, unless otherwise specified, terms such as "attached" or "connected" are intended to include integral connections, as well as connections between physically separate components.

Figure 1:
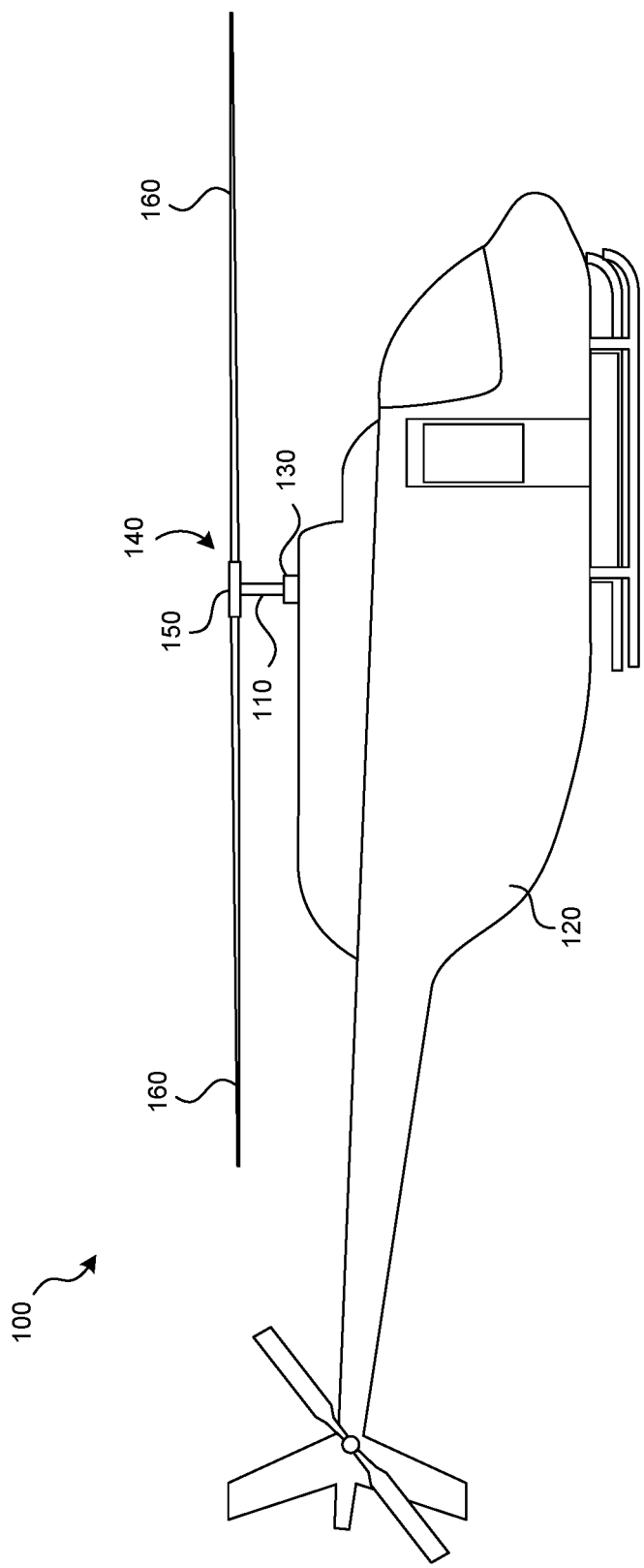
FIG. 1 is a schematic illustration of a rotary aircraft or rotorcraft implementing a rotor mast configured in accordance with embodiments of the present technology.

FIG. 1 is a schematic illustration of a rotary aircraft or rotorcraft 100 implementing a rotor mast 110 configured in accordance with embodiments of the present technology. The rotorcraft 100 may include a vehicle body 120, a power source 130 carried by the vehicle body 120, a rotor assembly 140 (which may include a hub 150 supporting one or more rotor blades 160, such as two or more rotor blades 160), and the rotor mast 110, which transfers rotation (torque) from the power source 130 to the rotor assembly 140 to rotate the rotor assembly 140 to create thrust and/or lift. The power source 130 can include an engine, a transmission, and/or other suitable devices or mechanisms for rotating the rotor mast 110 and the rotor assembly 140. The rotorcraft 100 can include features that are conventional to rotorcraft 100 or other aircraft, in addition to implementing aspects of the rotor mast 110 in accordance with embodiments of the present technology.

Figure 2:
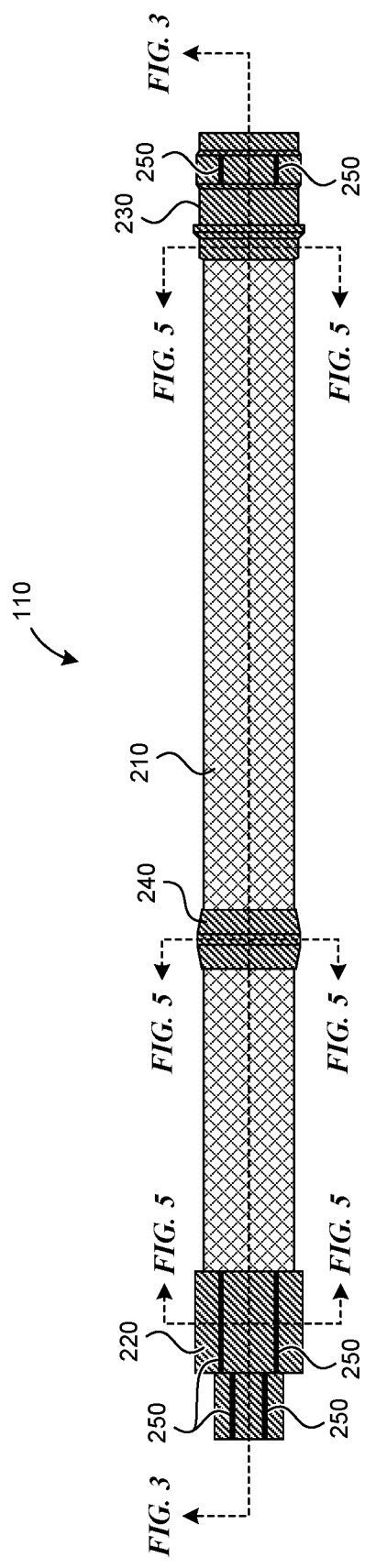
FIG. 2 is a partially schematic side view of the rotor mast shown in FIG. 1, configured in accordance with embodiments of the present technology.

FIG. 2 is a partially schematic side view of the rotor mast 110, configured in accordance with embodiments of the present technology. The rotor mast 110 includes a shaft body 210 and at least one fitting attached to the shaft body 210. For example, the rotor mast 110 may include a first fitting 220, a second fitting 230, and/or an inner race element 240 (which may be called a third fitting), each being attached to the shaft body 210. In some embodiments, the first fitting 220 may be configured to connect to the power source 130 (see FIG. 1). For example, the first fitting 220 may include a gear and/or the first fitting 220 may be connected to a gear, such as a splined drive, a bull gear, a planetary carrier, and/or another gear or plurality of gears, and/or another suitable connection to the power source 130. The second fitting 230 may be configured to connect to the hub 150 (see FIG. 1). The first and second fittings 220, 230 may include suitable features for transferring torque, such as splines (some representative splines 250 are schematically illustrated in FIG. 2). The inner race element 240 may be configured to mate with a bearing surface or other bearing device associated with the rotorcraft 100, such as a portion of the power source 130, for supporting the rotor mast 110 in an aligned position while also allowing rotation of the rotor mast 110.

The shaft body 210 comprises composite material, such as composite laminate material. The shaft body 210 may be formed by suitable composite manufacturing techniques. For example, in some embodiments, the shaft body 210 may be formed with a fiber placement process. The first and second fittings 220, 230 and/or the inner race element 240 may comprise metal material or another suitable material. Accordingly, the rotor mast 110 may be called a hybrid rotor mast because it may include a composite shaft body 210 attached to metal fittings.

Figure 3:
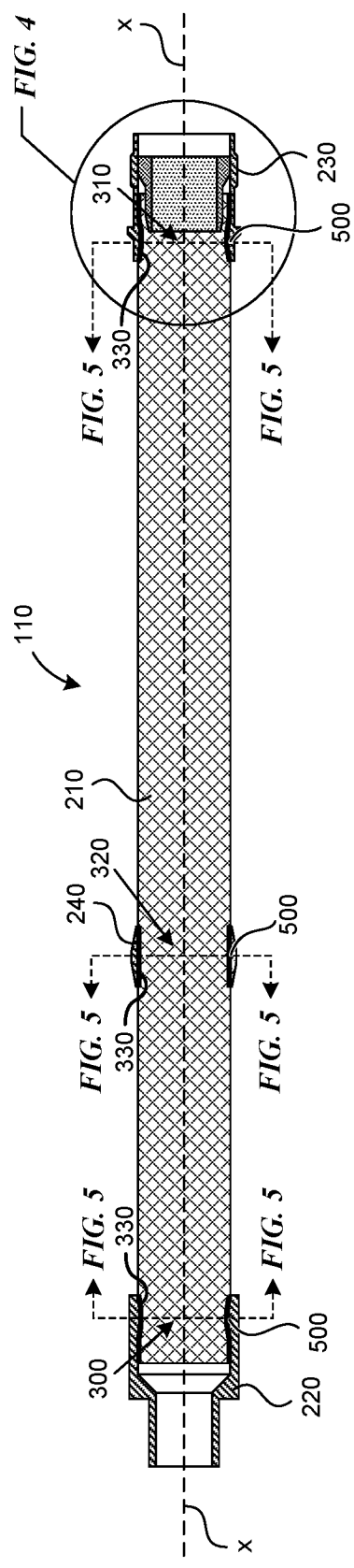
FIG. 3 is a partially schematic cross-sectional view of the rotor mast shown in FIG. 2, taken across the line labeled "FIG. 3" indicated in FIG. 2.

FIG. 3 is a partially schematic cross-sectional view of the rotor mast 110, taken across the line labeled "FIG. 3" in FIG. 2. The first fitting 220 includes a first fitting interior opening 300 positioned and configured to receive the shaft body 210. The second fitting 230 includes a second fitting interior opening 310 positioned and configured to receive the shaft body 210. The inner race element 240 also includes an inner race opening 320 positioned and configured to receive the shaft body 210. The shaft body 210 may extend through the inner race element 240 and into each of the fittings 220, 230. In some embodiments, the shaft body 210 may not extend through the full length of either of the fittings 220, 230. As explained in additional detail below, during assembly of the rotor mast 110, specifically during curing of the composite forming the shaft body 210, the shaft body 210 expands outwardly relative to its longitudinal axis x to contour against the inner surfaces of the fittings 220, 230, and/or the inner race element 240.

In some embodiments, the shaft body 210 may also be attached to the fittings 220, 230, 240 with an adhesive material 330 positioned in one or more (such as all) of the fittings 220, 230, 240, between the fittings 220, 230, 240 and the shaft body 210. In some embodiments, the adhesive can include an epoxy film adhesive such as FM 300 or AF 163, or another adhesive suitable for facilitating bonding between the composite shaft body 210 and the material forming the fittings with shear strength characteristics and other characteristics suitable for use in rotorcraft or otherwise suitable for bonding composite material to metal material. In some implementations of embodiments of the present technology, it may be preferable to include the adhesive material 330 in order to provide redundancy to the connection between the shaft body 210 and the fitting(s) 220, 230, 240. However, in some embodiments, the adhesive material 330 is optional and may be omitted if such redundancy is not required or desired.

Figure 4:
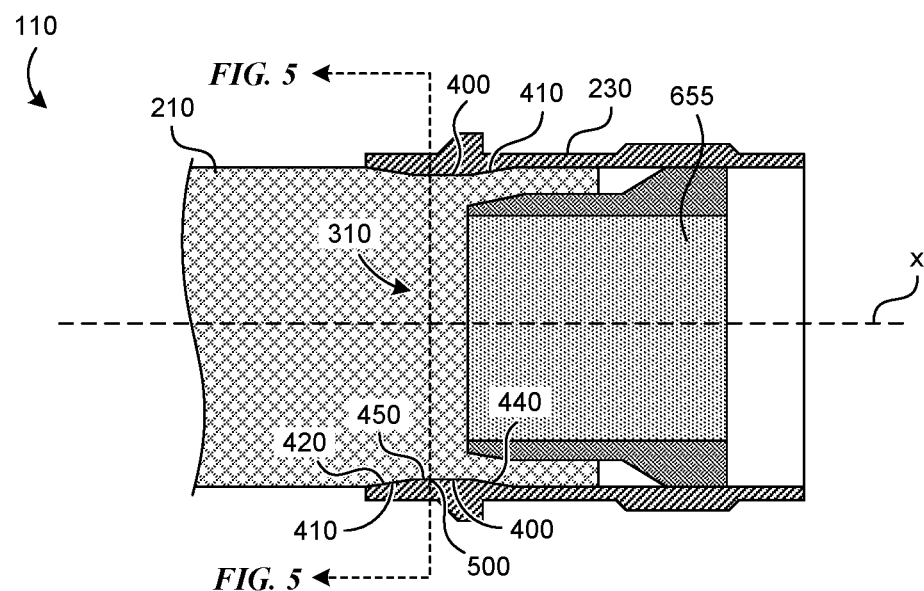
FIG. 4 is a detailed view of a portion of FIG. 3.

FIG. 4 is a detailed view of a portion of FIG. 3 (as indicated by the "FIG. 4" annotation in FIG. 3). To simplify the illustration in FIG. 4, the adhesive material 330 is not shown in FIG. 4. In some embodiments, an interface 400 between the second fitting 230 and the shaft body 210 may be contoured along the longitudinal axis x. Contouring the interface 400 along the longitudinal axis x provides a mechanical lock between the second fitting 230 and the shaft body 210, which complements the adhesive material 330.

To form the contour, the second fitting interior opening 310 may include an inner surface 410 that may be contoured along the longitudinal axis x. The interface 400 may be formed by the shaft body 210 being expanded against the inner surface 410. The inner surface 410 may include a first tapered section 420 in which the inner surface 410 converges toward the longitudinal axis x, a second tapered section 440 in which the inner surface 410 diverges away from the longitudinal axis x, and/or a non-tapered section 450 (extending parallel to the longitudinal axis x) positioned between the first and second tapered sections 420, 440. The first tapered section 420 may be called a converging portion and the second tapered section 440 may be called a diverging portion. In some embodiments, the non-tapered section 450 may be an apex or transition point rather than a surface extending along the longitudinal axis x.

The one or more tapered sections 420, 440 carry axial loads of the rotor mast 110 by resisting movement of the fitting 230 along the longitudinal axis x. For example, in some embodiments, the first tapered section 420 carries axial loads opposite the positive thrust direction and the second tapered section 440 carries axial loads in the positive thrust direction. The contouring of the inner surface 410 also carries moment loads (transverse to the x-axis) against the interface 400 to support moment loads on the overall rotor mast 110.

Although two tapered sections 420, 440 are illustrated and described with regard to FIG. 4, in some embodiments, more or fewer tapered sections may be implemented, which may entail additional non-tapered sections 450 therebetween. Accordingly, the inner surface 410 may be contoured in other ways to lock the fitting 230 in position along the longitudinal axis x and to lock the fitting 230 against moment loads.

Although FIG. 4 only shows the second fitting 230, in some embodiments, the interior opening 300 of the first fitting 220 may include a similar configuration as the interior opening 310 of the second fitting 230. For example, the first fitting 220 may include a converging taper, a diverging taper, and/or a non-tapered section between the converging taper and the diverging taper (FIG. 3 shows tapering of the opening 300 in the first fitting 220 similar to the tapering of the opening 310 in the second fitting 230). In other words, the interface 400 shown in FIG. 4 may be implemented in the first fitting 220. Accordingly, the first fitting 220 may also interface with the shaft body 210 in a manner that facilitates support of axial and moment loads by the rotor mast 110.

Figure 5:
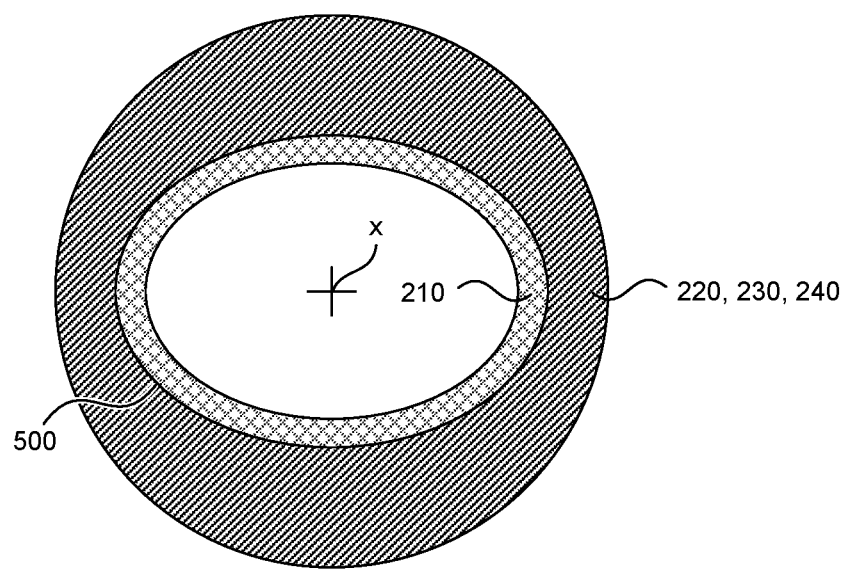
FIG. 5 is a schematic cross-sectional view of portions of FIGS. 2, 3, and/or 4, as indicated by the "FIG. 5" indicator in FIGS. 2, 3, and/or 4.

FIG. 5 is a schematic cross-sectional view of portions of FIGS. 2, 3, and/or 4, as indicated by the "FIG. 5" indicator in FIGS. 2, 3, and 4. To support torque loads (about the longitudinal axis x) between the shaft body 210 and the first fitting 220, the second fitting 230, and/or the inner race element 240, some or all of the interface 500 between the shaft body 210 and the fittings 220, 230, 240 may have a non-circular cross-sectional shape. For example, in some embodiments, the non-tapered section 450 between the tapered sections 420, 440 (see FIG. 4) may have a non-circular perimeter. Likewise, a non-tapered section between tapered sections in the first fitting 230 may have a non-circular perimeter. An inner perimeter of the inner race element 240 may have a non-circular perimeter. In some embodiments, the tapered sections of the fittings may have non-circular cross-sectional shapes. In other embodiments, the tapered sections may have circular cross-sectional shapes.

Because the shaft body 210 is expanded to be contoured against the interior of the fittings, the shaft body 210 may also have a non-circular cross-sectional shape at the interfaces 500. The engagement of the non-circular cross-sectional shapes of the shaft body 210 and the openings in the fittings facilitates transfer of torque between the shaft body 210 and the fittings.

In some embodiments, the non-circular interfaces 500 (and consequently, the non-circular perimeters of the openings within the fittings) have an elliptical shape. In some embodiments, the non-circular interfaces 500 may have oval shapes, shapes having one or more lobes, and/or shapes having one or more recesses. Embodiments of the present technology may have other suitable non-circular shapes.

Rotor masts configured in accordance with embodiments of the present technology may be manufactured with existing manufacturing methods. For example, the composite tube (shaft body 210) may be laid up on a mandrel (such as an inner mold line mandrel). To prevent fiber distortion, it may be important to consolidate the composite material. A suitable method for consolidating the laminate material includes fiber placement composite fabrication. The composite tube (shaft body 210) may then be installed in an outer mold line tool along with the fittings. The mandrel may be removed and replaced with a bladder. The bladder may apply pressure to creep the composite material outwardly toward the fittings and the tool (i.e., to contour the composite material against the inner surfaces of the fittings 220, 230, and/or the inner race element 240). Accordingly, the fittings may function as mold tooling during the curing process. After curing, the tool may be removed from the completed rotor mast assembly.

One aspect of the method of making a rotor mast takes advantage of the difference in coefficients of thermal expansion between metal components and composite components. While curing with heat, the metal components expand more than the composite components (which creep as the resin flows), and the composite material flows to meet the contour of the metal. When the assembly cools, the metal components clamp the composite with hoop compression. If a designer or operator wants to reduce (for example, minimize) or further control the hoop compression, the shaft assembly may include an optional plug element 655 (shown in FIG. 4, for example) temporarily or permanently positioned in the composite tube (shaft body 210) to support the composite tube (shaft body 210) during curing. The optional plug element 655 may be used to prevent the composite tube 210 from being pulled from the fitting during curing or after curing. However, in some embodiments, the plug element 655 may be omitted.

Advantages of the present technology include reduced weight, improved strength, and improved corrosion resistance relative to conventional rotor masts. Embodiments of the present technology also provide redundancies in the connection between the composite shaft body 210 and the metal components. For example, torque loads about the x-axis (which rotate the rotor assembly 140, for example) may be supported by the non-circular interfaces between the shaft body 210 and the fittings 220, 230, 240, with redundancy provided by the adhesive 300. Similarly, the axial contouring of the interfaces between the shaft body 210 and the fittings (for example, the tapered sections), supports axial and moment loads. The adhesive may further assist the mechanical bond formed by the contouring.

From the foregoing, it will be appreciated that some embodiments of the present technology have been described herein for purposes of illustration, but various modifications may be made without deviating from the disclosed technology. For example, the rotor mast 110 may include more or fewer fittings or bearing components. Although "rotor masts" are described, the technology described herein can be used to make other shaft assemblies, including other shaft assemblies for transferring rotation from a power source to a hub, such as propeller shafts for airplanes.

Further, while advantages associated with some embodiments of the technology have been described in the context of those embodiments, some embodiments may also exhibit said advantages, and not all embodiments need necessarily exhibit such advantages to fall within the scope of the present technology. Accordingly, the present disclosure and associated technology may encompass other embodiments not expressly described or shown herein.

What is claimed is:

1. A shaft assembly for transferring rotation from a power source to a hub, the shaft assembly comprising:
   a shaft body comprising composite material, the shaft body extending along a longitudinal axis; and
   a first fitting attached to a first end portion of the shaft body, the first fitting having a first interior opening positioned to receive the first end portion of shaft body; the first fitting being sized to cover only the first end portion of the shaft body, leaving at least a portion of the shaft body exposed as an exterior surface of the shaft assembly;
   a second fitting attached to a second end portion of the shaft body, the second fitting having a second interior opening positioned to receive the second end portion of shaft body; the second fitting being sized to cover only the second end portion of the shaft body;
   the first fitting and second fitting leaving at least medial portions of the shaft body exposed as an exterior surface of the shaft assembly;
   wherein a cross-section of at least one of the first interior opening or the second interior opening taken perpendicular to the longitudinal axis comprises a non-circular perimeter.

2. The shaft assembly of claim 1, wherein the non-circular perimeter comprises an oval shape, an elliptical shape, a shape having one or more lobes, or a shape having one or more recesses.

3. The shaft assembly of claim 1, further comprising an adhesive between at least one of the first fitting or the second fitting and the shaft body.

4. The shaft assembly of claim 1, wherein the shaft assembly is a rotor mast for a helicopter.

5. The shaft assembly of claim 1, wherein at least one of the first fitting or the second fitting comprises a metal material.

6. The shaft assembly of claim 1, wherein the first fitting comprises means for transferring torque from the first fitting to the power source or to the hub.

7. The shaft assembly of claim 6, wherein the means for transferring torque comprises splines on the fitting.

8. The shaft assembly of claim 1, further comprising an inner race element positioned between the first fitting and the second fitting on the shaft body; inner race element leaving at least portions of the shaft body, between the first fitting and the inner race element and the second fitting and the inner race element, exposed as an exterior surface of the shaft assembly.

9. The shaft assembly of claim 8, wherein the inner race element is configured to mate with a bearing surface of a rotor aircraft.

10. The shaft assembly of claim 1, wherein the second interior opening comprises a first tapered section in which the second fitting converges toward the longitudinal axis and a second tapered section in which the second fitting diverges from the longitudinal axis.

11. The shaft assembly of claim 10, wherein the non-circular perimeter is positioned between the tapered sections.

12. The shaft assembly of claim 10, further comprising a plug element positioned within the second interior such that it disposes the second end portion of the shaft body between the plug element and the first tapered section and second tapered section of the second fitting.

13. An aerospace system comprising:
an aerospace vehicle;
a power source carried by the aerospace vehicle;
a rotor assembly comprising a hub and one or more rotor blades supported by the hub; and
a shaft assembly for transferring rotation from the power source to the hub, wherein the shaft assembly comprises:
a shaft body comprising composite material, the shaft body extending along a longitudinal axis; and
a first metal fitting attached to a first end portion of the shaft body, the first metal fitting having a first interior opening positioned to receive the first end portion of shaft body; the first metal fitting being sized to cover only the first end portion of the shaft body, leaving at least a portion of the shaft body exposed as an exterior surface of the shaft assembly;
a second metal fitting attached to a second end portion of the shaft body, the second metal fitting having a second interior opening positioned to receive the second end portion of shaft body; the second metal fitting being sized to cover only the second end portion of the shaft body;
the first metal fitting and second metal fitting leaving at least medial portions of the shaft body exposed as an exterior surface of the shaft assembly;
wherein a cross-section of at least one of the first interior opening or the second interior opening taken perpendicular to the longitudinal axis comprises a non-circular perimeter.

14. The aerospace system of claim 13, wherein the aerospace vehicle is an airplane.

15. The shaft assembly of claim 13, further comprising an inner race element positioned between the first metal fitting and the second metal fitting on the shaft body; inner race element leaving at least portions of the shaft body, between the first metal fitting and the inner race element and the second metal fitting and the inner race element, exposed as an exterior surface of the shaft assembly.

16. The aerospace system of claim 13, wherein the aerospace vehicle is a rotorcraft.

17. The aerospace system of claim 16, wherein the rotorcraft is a helicopter.

18. A fitting assembly for a rotatable shaft assembly, the fitting assembly comprising:
a first fitting having a first interior opening positioned to receive a first end portion of a shaft body;
a second fitting having a second interior opening positioned to receive a second end portion of the shaft body, wherein the second interior opening comprises a converging portion, a diverging portion, and a non-circular perimeter of a cross-sectional portion of the interior opening positioned between the converging portion and the diverging portion;
wherein the first fitting and second fitting are sized to leave at least medial portions of the shaft body exposed by the fitting assembly.

19. The fitting of claim 18, wherein the non-circular perimeter of the cross-sectional portion comprises an oval or elliptical cross-section.

20. The fitting of claim 18, wherein the converging portion and the diverging portion each comprise circular cross-sections.

* * * * *